United States Patent
Jeon et al.

(10) Patent No.: US 9,706,018 B2
(45) Date of Patent: Jul. 11, 2017

(54) GATEWAY APPARATUS AND METHOD FOR SYNCHRONIZATION BETWEEN HETEROGENEOUS NETWORK DOMAINS WITHIN VEHICLE

(71) Applicant: Research & Business Foundation Sungkyunkwan University, Suwon-si (KR)

(72) Inventors: Jae Wook Jeon, Suwon-si (KR); Jin Ho Kim, Suwon-si (KR); Bo Mu Cheon, Suwon-si (KR); Yong Ju Kim, Suwon-si (KR); Young Seo Lee, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 155 days.

(21) Appl. No.: 14/729,470

(22) Filed: Jun. 3, 2015

(65) Prior Publication Data

US 2016/0080533 A1 Mar. 17, 2016

(30) Foreign Application Priority Data

Sep. 17, 2014 (KR) .......................... 10-2014-0123734

(51) Int. Cl.
*H04L 29/06* (2006.01)
*H04L 12/66* (2006.01)
(Continued)

(52) U.S. Cl.
CPC ............ *H04L 69/28* (2013.01); *H04L 12/403* (2013.01); *H04L 12/6418* (2013.01);
(Continued)

(58) Field of Classification Search
CPC ......... H04L 12/40091; H04L 12/40097; H04L 12/46; H04L 12/462; H04L 12/4625; H04L 12/403; H04L 12/6418; H04L 12/66; H04L 2012/40241; H04L 2012/40273; H04L 69/18; H04L 69/28
(Continued)

(56) References Cited

U.S. PATENT DOCUMENTS 8,233,470 B2 * 7/2012 Yang ..................... H04W 56/00
370/350
8,892,934 B2 * 11/2014 Gotz ......................... G04G 7/00
375/356

(Continued)

*Primary Examiner* — Chi H Pham
*Assistant Examiner* — Robert Lopata
(74) *Attorney, Agent, or Firm* — NSIP Law

(57) ABSTRACT

A gateway apparatus includes a first network controller, a second network controller, and a time synchronization control unit. The first network controller has a first timer time-synchronized with nodes within a first network domain. The second network controller has a second timer time-synchronized with nodes within a second network domain. The time synchronization control unit includes a processor configured to store the observed times of the switching points of synchronized time slots within the first network domain, based on system time within the second network domain, and adjusts the rate of the second timer based on a comparison of a time difference between the successive observed times and a nominal length of the time slots.

15 Claims, 2 Drawing Sheets

(51) Int. Cl.
*H04L 12/403* (2006.01)
*H04L 12/64* (2006.01)
*H04L 12/40* (2006.01)

(52) U.S. Cl.
CPC .............. *H04L 12/66* (2013.01); *H04L 69/18* (2013.01); *H04L 2012/40241* (2013.01); *H04L 2012/40273* (2013.01)

(58) Field of Classification Search
USPC ........................................................ 370/402
See application file for complete search history.

(56) References Cited

U.S. PATENT DOCUMENTS

| | | | |
|---|---|---|---|
| 2007/0274330 A1* | 11/2007 | Lietz | H04L 12/4625 370/402 |
| 2008/0212564 A1* | 9/2008 | Lee | H04L 12/4625 370/350 |
| 2010/0049891 A1* | 2/2010 | Hartwich | H04J 3/0655 710/110 |
| 2010/0254499 A1* | 10/2010 | Thavisri | H04J 3/0697 375/356 |
| 2010/0318646 A1* | 12/2010 | Ungermann | H04J 3/0652 709/223 |
| 2012/0140861 A1* | 6/2012 | Menon | B60T 7/18 375/356 |
| 2012/0278507 A1* | 11/2012 | Menon | H04J 3/0655 709/248 |
| 2013/0013952 A1* | 1/2013 | Gotz | G04G 7/00 713/400 |
| 2013/0034197 A1* | 2/2013 | Aweya | H04J 3/0664 375/362 |
| 2013/0311695 A1* | 11/2013 | Gossner | H04L 12/46 710/313 |
| 2014/0022912 A1* | 1/2014 | Kim | H04L 12/40163 370/244 |
| 2014/0247892 A1* | 9/2014 | Williams | H04B 3/54 375/257 |
| 2015/0003443 A1* | 1/2015 | Koenigseder | H04W 40/20 370/350 |
| 2015/0134764 A1* | 5/2015 | Noebauer | H04L 67/12 709/208 |
| 2015/0295669 A1* | 10/2015 | Chapman | H04L 5/0007 370/503 |
| 2015/0333899 A1* | 11/2015 | Nobauer | H04J 3/0632 370/503 |
| 2017/0084179 A1* | 3/2017 | Chen | B62D 15/025 |

* cited by examiner

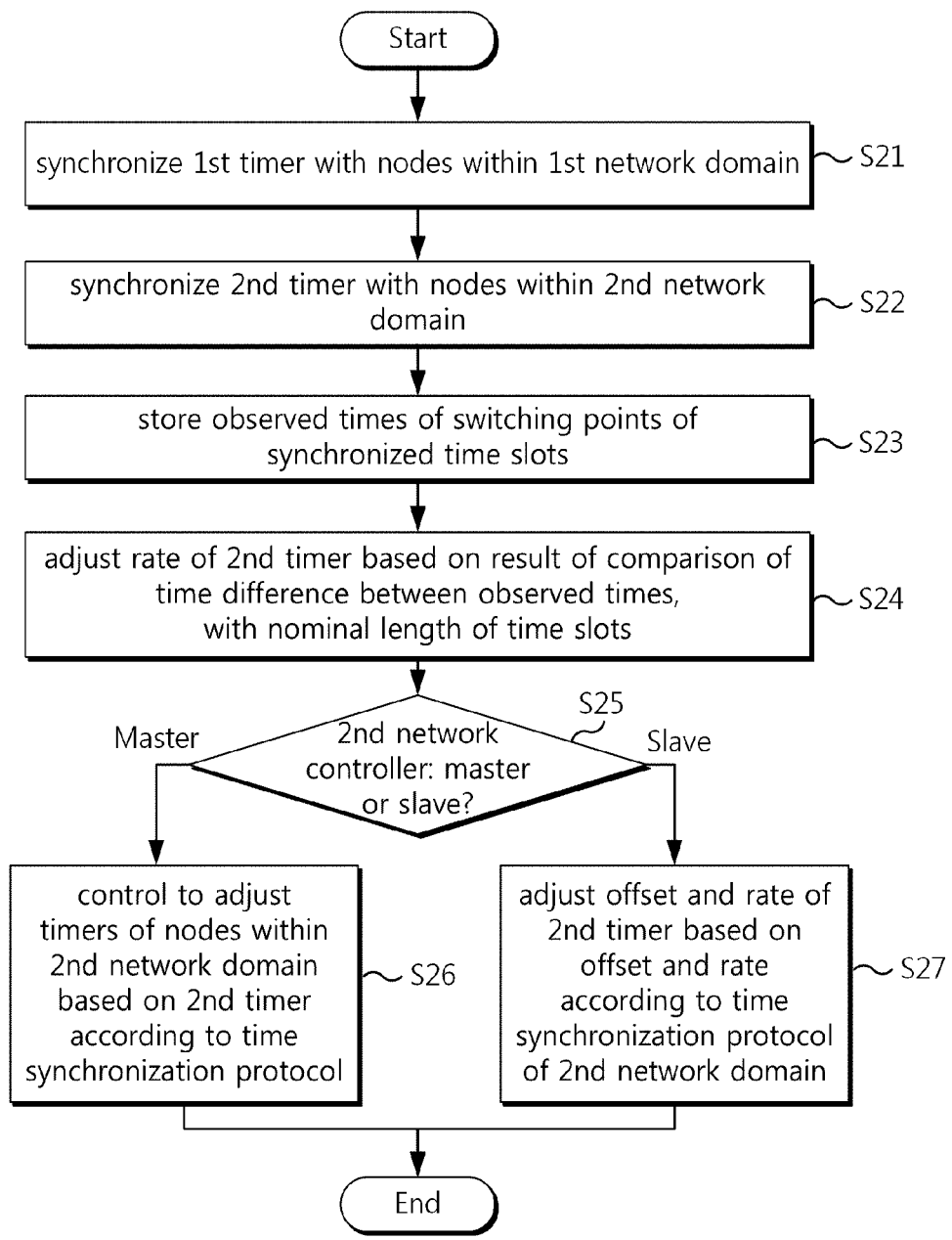

GATEWAY APPARATUS AND METHOD FOR SYNCHRONIZATION BETWEEN HETEROGENEOUS NETWORK DOMAINS WITHIN VEHICLE

CROSS-REFERENCE TO RELATED APPLICATION(S)

This application claims the benefit under 35 USC 119(a) of Korean Patent Application No. 10-2014-0123734 filed on Sep. 17, 2014 in the Korean Intellectual Property Office, the entire disclosure of which is incorporated herein by reference for all purposes.

BACKGROUND

Field

The present application relates to technology used in connection with a gateway for heterogeneous networking within a vehicle.

Description of Related Art

Automobiles have been equipped with an increasing number of electronic products. The electronic products have been provided with a wide variety of additional sensors and control devices. Some of the products connect to an external network. Accordingly, various types of network technology that can be used in automobiles has also been developed.

For example, parts historically operated using hydraulic components or mechanical components have been replaced with sensors. For example, to recognize the manipulation of a driver, an Electronic Control Unit (ECU) for controlling drive signals based on the manipulation, and actuators for actually generating operations in response to the drive signals, have been developed.

Since these parts are individually developed and integrated with automobiles in accordance with characteristics and purposes specific to automobiles, ECUs, such as an engine ECU and a transmission ECU, as well as control devices, such as an anti-lock braking system (ABS), and an airbag and Vehicle Dynamics Control (VDC), each have a strong tendency to be independent. For this reason, wiring and noise between the ECUs and the sensors has become problematic. Accordingly, an independent protocol for networking within a vehicle has become necessary.

A representative technology related to networking within a vehicle is Controller Area Network (CAN) communication. CAN communication supports various communication speeds ranging from a low speed to a high speed, and minimizes a ripple effect even when a specific node fails.

When a sensor and an actuator are simply connected without a control device, a Local Interconnect Network (LIN) communication protocol, which is simpler, slower and cheaper than CAN communication, can be employed.

Additionally, automobiles require higher bandwidth due to their higher performance and precision. In particular, a safety device, a steering device, and the like require determinism to ensure that a sensing signal reaches a controller within a specific period of time, or that a signal is transferred from a controller to an actuator within a specific period of time. However, even CAN communication is limited in ensuring these features. Accordingly, communication standards, such as Media Oriented Systems Transport (MOST), MOST2, IEEE 1394, etc., that are faster and have improved reliability have been proposed.

Moreover, since a number of the parts and functions employ their own communication specifications, a resultant complexity of vehicle network environments is extremely high.

After extensive trial and error, a consortium of leading automobile part providers, vehicle semiconductor providers and automobile manufacturers have proposed FlexRay communication.

While CAN communication is a collision detection-based contentious communication method, FlexRay communication is a communication method that is based on a time division principle and can support both deterministic data and non-deterministic data.

To maximally utilize bandwidth within a fixed time slot, FlexRay communication repeats a time slot with a single slot period divided into a static segment, a dynamic segment, a symbol window, and a network idle time. The static segment is an interval assigned for a relatively important deterministic transmission; the dynamic segment is an interval assigned for a wide range of event-based data not requiring a high determinism; the symbol window is an interval for the maintenance of a network and for a start of signaling; and the network idle time is an interval for synchronization.

Based on the above-described structure, FlexRay communication can deal with low- and high-speed applications using a single protocol, and can provide a transmission which minimizes error and effectively addresses scalability. Furthermore, in FlexRay communication, a specific master node does not control the overall network. Rather, in FlexRay communication, individual nodes perform synchronization and communication in cooperation with each other. The individual nodes may synchronize the local clocks of the individual nodes with a single common global clock through synchronization based on network idle time. FlexRay is faster and more reliable than CAN and certain other protocols.

Another promising technology for networking within a vehicle is vehicle Ethernet communication. Ethernet is a communication technology that has been sufficiently matured and widely used, and thus attracts attention because it can provide a network capable of providing fast speed while ensuring sufficient reliability and determinism at low cost. Ethernet is also easily extendible.

The development of automobiles has occurred such that many part providers and automobile manufacturers are together involved in problem solving. Often, the automobile manufacturers adopt solutions proposed by the part providers. Accordingly, there is an increasing possibility that electronic parts connected by more than one network protocol will coexist in a single vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a gateway apparatus for synchronization between heterogeneous network domains within a vehicle is provided. The gateway apparatus comprises a first network controller configured to have a first timer time-synchronized with nodes within a first network domain, a second network controller configured to have a second timer time-synchronized with nodes within a second network domain, and a time synchronization control unit including a processor configured to store observed times of switching points of synchronized time slots within the first network domain, based on system time, within the second network domain, and to adjust a rate of the second timer based on a result of a comparison of a time difference between the successive observed times and a nominal length of the time slots.

The first network domain may be constructed based on a FlexRay communication method.

The second network domain may be constructed based on a vehicle Ethernet communication method.

The first timer may be longer than a tick of the second timer, and a length of the time slots of the first network domain may be shorter than a synchronization period of the second network domain.

In response to the second network controller being designated as a master of a determined time synchronization protocol that operates in every synchronization period within the second network domain, the time synchronization control unit may operate to control the second network controller in order to adjust timers of the nodes within the second network domain based on the second timer in accordance with the determined time synchronization protocol.

In response to the second network controller being designated as a slave of a determined time synchronization protocol that operates in every synchronization period within the second network domain, the time synchronization control unit may operate to adjust an offset and a rate of the second timer based on an offset and a rate determined in accordance with the time synchronization protocol, rather than adjusting the offset and the rate according to the result of the comparison.

The first network controller may be connected to a time division deterministic communication method-based first network domain.

The second network controller may be connected to a contentious communication method-based second network domain.

In another general aspect, a method of time synchronization for a gateway apparatus for synchronization between heterogeneous network domains within a vehicle is provided. The method includes time synchronizing a first timer with respect to nodes within a first network domain using a first network controller, time synchronizing a second timer with respect to nodes within a second network domain using a second network controller, storing observed times of switching points of synchronized time slots within the first network domain based on system time within the second network domain, and adjusting a rate of the second timer based on a result of a comparison of a time difference between the successive observed times and a nominal length of the time slots.

The first network domain may be constructed based on a FlexRay communication method.

The second network domain may be constructed based on a vehicle Ethernet communication method.

A tick of the first timer may be longer than a tick of the second timer, and a length of the time slots of the first network domain may be shorter than a synchronization period of the second network domain.

In response to the second network controller being designated as a master of a determined time synchronization protocol that operates in every synchronization period within the second network domain, the second network controller may control to adjust timers of the nodes within the second network domain based on the second timer in accordance with the determined time synchronization protocol.

In response to the second network controller being designated as a slave of a determined time synchronization protocol that operates in every synchronization period within the second network domain, an offset and a rate of the second timer may be adjusted based on an offset and a rate determined in accordance with the time synchronization protocol, rather than adjusting the offset and the rate according to the result of the comparison.

In another general aspect, a computer program embodied on a non-transitory computer readable medium configured to control a processor to perform a method described herein is provided.

The Other features and aspects will be apparent from the following detailed description, the drawings, and the claims.

BRIEF DESCRIPTION OF THE DRAWINGS

FIG. 2 is a flowchart illustrating an example of a method for synchronization using a gateway apparatus for synchronization between heterogeneous network domains within a vehicle.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
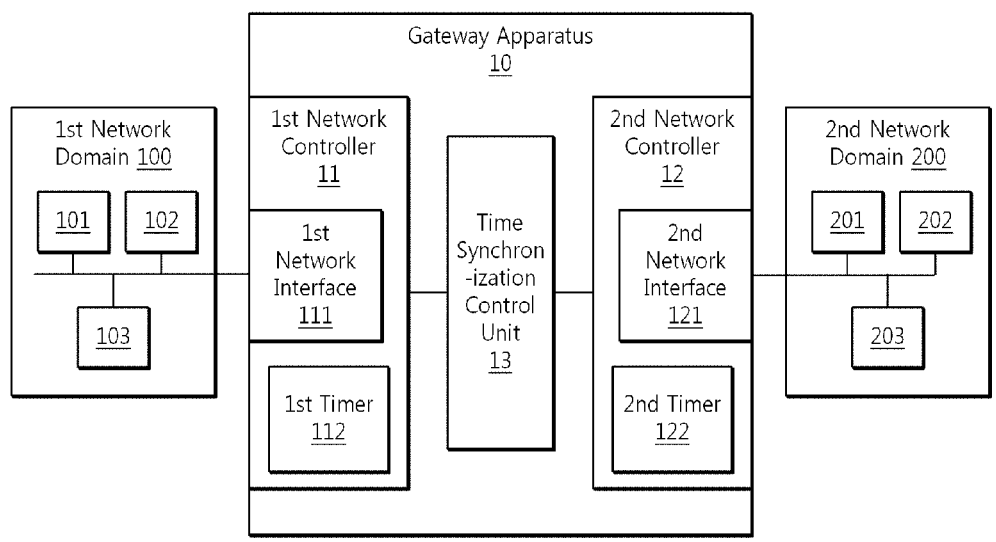
FIG. 1 is a conceptual diagram illustrating an example of a gateway apparatus for synchronization between heterogeneous network domains within a vehicle.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a conceptual diagram illustrating an example of a gateway apparatus for synchronization between heterogeneous network domains within a vehicle.

Referring to FIG. 1, the gateway apparatus 10 for synchronization between heterogeneous network domains within a vehicle includes a first network controller 11, a second network controller 12, and a time synchronization control unit 13. The time synchronization control unit may include at least one processing device.

The first network controller 11 may include a first network interface 111 connected to a time division communication method-based first network domain 100, and a first timer 112 time-synchronized with nodes 101, 102 and 103 within the first network domain 100.

Since the first network domain 100 is operated using a time division communication method, the nodes 101, 102 and 103 and the first network interface 111 are controlled to transmit and receive packets within corresponding time slots synchronized with specific timing in accordance with a predetermined order and set of rules.

In an embodiment, the first network domain 100 may be a FlexRay communication method-based bus system.

A single cycle (hereinafter also referred to as a "time slot") of FlexRay communication may be set in milliseconds (ms), and may be nominally set to 5 ms. The term "nominally" is used because it is not necessarily important to set cycle time based on a particular physical time. If a FlexRay network having a single cycle period of 5 ms operates correctly as designed, and thus all nodes have been synchronized, all the nodes will operate on the assumption that a single cycle is 5 ms.

In an embodiment, a single cycle may include a static segment for high-speed deterministic communication; a dynamic segment for event-based communication that does not require determinism; and a symbol window and a network idle time (NIT) for the maintenance of the network. A macrotick that constitutes part of a cycle may be about 1 μs.

In embodiments, the first network controller 11 is synchronized with the other nodes 101, 102 and 103 within the first network domain 100 based on the time at which NIT (i.e., which repeats for each time slot of FlexRay communication) terminates, and the time at which a subsequent time slot starts (i.e., the time at which switching between two successive time slots or cycles is performed). That is, synchronization may occur between consecutive time slots, and more particularly, between an endpoint of an interval between time slots and an end point of a consecutive time slot.

For simplicity, the description of synchronization herein has been limited to synchronization that is operating in a steady state because a cold start has been appropriately performed. However, these descriptions are exemplary only, are not intended to limit this disclosure.

In an embodiment, first timer 112 detects a timing at which the nodes 101, 102 and 103 connected to a FlexRay communication bus start initial transmission in each time slot, compares the detected timing with a timing based on a microtick counted by the first timer 112, and adjusts the timing rate by changing a tick if its current timing is later or earlier than the detected timing, thereby compensating for a drift that may occur during each time slot.

In an embodiment, the first network domain 100 pursues synchronization between the switching times of time slots between the internal nodes 101, 102, 103 and 111 after the bus system has been appropriately cold-started after the startup of the vehicle. This synchronization method does not require accurate time stamping used to identify a time (e.g., seconds, minutes, hours, date, month and year), based on a system time, at which time an event for a specific operation occurred.

In embodiments, a gateway apparatus that connects to a network domain that normally operates based on system time may need to employ a synchronization method that is different from an existing synchronization method.

In an embodiment, the second network controller 12 may include a second network interface 121 connected to a contentious communication method-based second network domain 200, and a second timer 122 time-synchronized with nodes 201, 202 and 203 within the second network domain 200.

The second network domain 200 is operated using a collision detection-based contentious communication method which operates without dependency upon a determined time slot. Here, the nodes 201, 202 and 203 and the second network interface 121 may be controlled using, for example, a Carrier Sense Multiple Access/Collision Detection (CSMA/CD) method that detects a carrier on a bus, and performs a transmission when a carrier is not detected, and a retransmission after a random delay when a collision is detected after transmission. The second network domain 200 may achieve a predetermined Quality of Service (QoS) threshold, and may ensure determinism using techniques, such as precise time synchronization, priority, back pressure, flow control, scheduled traffic, traffic shaping, and full duplex switching.

In an embodiment, the second network domain 200 may be an automotive Ethernet communication method-based network that ensures determinism.

In the automotive Ethernet communication method-based network, nodes 201, 202 and 203 within the second network domain 200 and the second network interface 121 may be synchronized according to a predetermined time synchronization protocol, such as either of a Network Time Protocol (NTP) or a Precision Time Protocol (PTP).

NTP and PTP are briefly described as follows. In these methods, while special messages are transmitted and received between a master and a slave in each synchronization period, time stamps related to the transmission time and to the reception time are recorded. The slave may calculate an offset, i.e., an error between the master and the slave, based on the recorded time stamps, and may also correct the error of its own clock based on the calculated offset.

Furthermore, slaves track the frequency and the extent to which their own clocks should be corrected, and then correct the speed at which the tick of a clock changes, i.e., the "tick rate," or the "clock tick rate." In the Ethernet communication method, the tick is normally set to 1 nanosecond (ns).

The synchronization period may be determined based on bandwidth, on overhead and on required precision, and may range from hundreds of milliseconds to a few seconds.

Since each of the slaves is precisely synchronized by correcting the error and the rate of its own clock with respect to the master, as described above, the nodes 201, 202 and 203 within the second network domain 200 and the second network interface 121 may be synchronized based on the clock of the master.

Accordingly, when the second network controller 12 is designated as a slave of the predetermined time synchronization protocol that is operated for each synchronization period in the second network domain 200, the second timer 122 may be controlled based on offset and on a rate that are determined by the predetermined time synchronization protocol.

In the NTP or PTP protocol, a specific device may be set as the master, or a device with the most precise clock may be set as the master in such a way that each node notifies a neighboring node of the performance of its own clock.

In an embodiment, the second network controller 12 of the gateway apparatus 10 operates as the master because a gateway apparatus or a switch device can normally have a more precise clock than each node has.

In this case, the time of the second timer 122 may act as a criterion for the correction of the clocks of other nodes 201, 202 and 203.

If the tick of the second timer 122 is synchronized with the time slot length of the first network domain 100, the system time of the overall second network domain 200 may be synchronized with the first network domain 100.

For this purpose, the time synchronization control unit 13 may store the observed times of synchronized time slots within the first network domain 100 based on the system time in the second network domain 200, and may adjust the rate at which a tick changes in the second timer 122 (i.e., tick rate), based on the result of a comparison of the time differences between the successive observed times with the nominal length of the time slots.

For example, when the switching point of a first time slot is recorded as T1 and the switching point of a subsequent time slot is recorded as T2 based on the clock of the second timer 122, the time difference T2−T1 is the observed as a length of a single time slot based on the clock of the second timer 122. If the time difference T2−T1, which is an observed length, is shorter than the nominal length of the time slot, for example, 5 ms, it may be considered that the second timer 122 performs a faster counting than the first timer 112. Here, an adjustment may be made by reducing tick rate so that slower counting can be performed.

The tick of the first timer 112 of the first network controller 11, such as that of FlexRay, changes based on a microsecond unit, and the tick of the second timer 122 of the same second network controller 12, such as that of Ethernet, is based on a nanosecond unit. Accordingly, adjusting the tick rate of the first timer 112 may be preferable to adjusting the tick rate of the second timer 122.

Furthermore, the length of a single time slot of the first network domain 100 may be shorter than the synchronization period of the second network domain 200. This means that the first network controller 11 and its first timer 112 that are synchronized in accordance with the first network domain 100 may repeatedly correct the rate in a shorter period, and the second timer 122 may also operate to frequently correct rate with respect to the corrected first timer.

If the second network controller 12 operates as the master, the second network controller 12 may be controlled by the time synchronization control unit 13 such that second network controller 12 adjusts the timers of the nodes 201, 202 and 203 within the second network domain 200 based on the second timer 122 according to the predetermined time synchronization protocol.

When the length of the time slot (i.e., a cycle) is, for example, 5 ms and the synchronization period is, for example, 1 second, the second timer 122 is adjusted in accordance with the first network domain 100 every 5 ms, and the slave nodes 201, 202 and 203 of the second network domain 200 are adjusted to the corrected clock of the second timer 122 every 1 second.

Accordingly, the second network domain 200 may be precisely synchronized with the first network domain 100.

FIG. 2 is a flowchart illustrating an example of a method for synchronization using a gateway apparatus for synchronization between heterogeneous network domains within a vehicle.

Referring to FIG. 2, a method of time synchronization is illustrated for the gateway apparatus 10 including the first network controller 11 connected to the time division deterministic communication method-based first network domain 100 and configured to include the first timer 112 in the vehicle and the second network controller 12 connected to the contentious communication method-based second network domain 200 and configured to include the second timer 122.

At step S21, the gateway apparatus 10 may time synchronize the first timer 112 with the nodes 101, 102 and 103 within the first network domain 100 using the first network controller 11.

Meanwhile, at step S22, the gateway apparatus 10 time synchronizes the second timer 122 with the nodes 201, 202 and 203 within the second network domain 200 using the second network controller 12.

After the first and second network domains 100 and 200 have been synchronized by themselves, the gateway apparatus 10 stores the observed times of the switching points of synchronized time slots within the first network domain 100 based on the system time of the second network domain 200 at step S23.

At step S24, the gateway apparatus 10 may adjust the rate of the second timer 122 based on the result of the comparison obtained by comparing the time difference between successive observed times with the nominal length of the time slots.

In an embodiment, the first network domain 100 may be constructed based on a FlexRay communication method, and the second network domain 200 may be constructed based on a vehicle Ethernet communication method.

In an embodiment, the tick of the first timer 112 may be longer than the tick of the second timer 122. For example, the tick of the first timer 112 may be 1 μs, and the tick of the second timer 122 may be 1 ns.

Furthermore, the length of a single time slot of the first network domain 100 may be shorter than the synchronization period of the second network domain 200. For example, the length of a single time slot of the first network domain 100 may be 5 ms, and the synchronization period of the second network domain 200 may be 1 second.

At step S25, a determination is made regarding whether the second network controller 12 will be designated as a master of a predetermined time synchronization protocol that operates at every synchronization period within the second network domain 200 or as a slave. The process may proceed to step S26 if the second network controller 12 has been designated as the master, and may proceed to step S27 if the second network controller 12 has been designated as the slave.

If the second network controller 12 has been designated as a master of the predetermined time synchronization protocol that operates every synchronization period within the second network domain 200 at step S25, the gateway apparatus 10 may control the second network controller 12 so that the second network controller 12 adjusts the timers of the nodes 201, 202 and 203 within the second network domain 200 based on the second timer 122 according to the predetermined time synchronization protocol at step S26.

In contrast, if the second network controller 12 has been designated as a slave of the predetermined time synchronization protocol that operates every synchronization period within the second network domain 200 at step S25, it may be possible to adjust the offset and the rate of the second timer 122 based on an offset and a rate determined in accordance with the time synchronization protocol rather than the result of the comparison obtained by comparing the time difference between successive observed times with the nominal length of the time slots, at step S27.

At least some embodiments of the present application provide synchronization between a FlexRay network domain and an Ethernet network domain within a vehicle.

At least some embodiments of the present application provide the advantage of providing a gateway means for interconnection between a FlexRay network domain and an Ethernet network domain within a vehicle.

The above embodiments and the accompanying drawings are intended merely to clearly illustrate part of the technical spirit of the present application, and it will be apparent to those skilled in the art that modifications and specific embodiments that those skilled in the art can easily derive from the present specification and the accompanying drawings are all included in the range of the rights of the present application.

The apparatuses, units, modules, devices, and other components illustrated in FIG. 1 that perform the operations described herein are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein in connection with FIGS. 1 and 2. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIG. 2 that performs the operations described herein is performed by a processor or a computer, as described above, executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

What is claimed is:

1. A gateway apparatus to synchronize between heterogeneous network domains, the gateway apparatus comprising:
   a first network controller comprising a first timer time-synchronized with nodes within a first network domain;
   a second network controller comprising a second timer time-synchronized with nodes within a second network domain; and
   a time synchronization control unit configured to store observed times of switching points of synchronized time slots within the first network domain based on system time within the second network domain, and to adjust a rate of the second timer based on a result of a comparison of a time difference between the successive observed times and a nominal length of the time slots.

2. The gateway apparatus of claim 1, wherein the first network domain is constructed based on FlexRay communication.

3. The gateway apparatus of claim 1, wherein the second network domain is constructed based on vehicle Ethernet communication.

4. The gateway apparatus of claim 1, wherein a tick of the first timer is longer than a tick of the second timer, and a length of the time slots is shorter than a synchronization period of the second network domain.

5. The gateway apparatus of claim 1, wherein the time synchronization control unit is further configured to control the second network controller to adjust timers of the nodes within the second network domain based on the second timer according to a time synchronization protocol that operates in a synchronization period within the second network domain, in response to the second network controller being designated as a master of the time synchronization protocol.

6. The gateway apparatus of claim 1, wherein the time synchronization control unit is further configured to adjust an offset and a rate of the second timer based on an offset and a rate determined according to a time synchronization protocol that operates in a synchronization period within the second network domain, in response to the second network controller being designated as a slave of the time synchronization protocol.

7. The gateway apparatus of claim 1, wherein the first network domain is configured to use time division deterministic communication.

8. The gateway apparatus of claim 1, wherein the second network domain is configured use contentious communication.

9. A method to synchronize between heterogeneous network domains, the method comprising:
time synchronizing a first timer with respect to nodes within a first network domain using a first network controller;
time synchronizing a second timer with respect to nodes within a second network domain using a second network controller;
storing observed times of switching points of synchronized time slots within the first network domain based on system time within the second network domain; and
adjusting a rate of the second timer based on a result of a comparison of a time difference between the successive observed times and a nominal length of the time slots.

10. The method of claim 9, wherein the first network domain is constructed based on FlexRay communication.

11. The method of claim 9, wherein the second network domain is constructed based on vehicle Ethernet communication.

12. The method of claim 9, wherein a tick of the first timer is longer than a tick of the second timer, and a length of the time slots of the first network domain is shorter than a synchronization period of the second network domain.

13. The method of claim 9, further comprising controlling the second network controller to adjust timers of the nodes within the second network domain based on the second timer in accordance with a time synchronization protocol that operates in a synchronization period within the second network domain, in response to the second network controller being designated as a master of the time synchronization protocol.

14. The method of claim 9, further comprising, adjusting an offset and a rate of the second timer based on an offset and a rate determined in accordance with a time synchronization protocol that operates in a synchronization period within the second network domain, in response to the second network controller being designated as a slave of the time synchronization protocol.

15. A non-transitory computer-readable medium storing instructions that, when executed by a processor, cause the processor to perform the method of claim 9.

* * * * *